United States Patent

Takahashi et al.

[11] 3,997,457
[45] Dec. 14, 1976

[54] CERAMIC DIELECTRIC COMPOSITION

[75] Inventors: Koji Takahashi; Norishige Yamaguchi; Makoto Hori; Yoshiaki Sugimura, all of Tokyo, Japan

[73] Assignee: TDK Electronics Company, Limited, Tokyo, Japan

[22] Filed: Mar. 2, 1976

[21] Appl. No.: 663,132

[30] Foreign Application Priority Data

Mar. 5, 1975 Japan .................. 50-26613

[52] U.S. Cl. .................. 252/63.5; 106/39.5; 106/73.31; 317/258; 423/593
[51] Int. Cl.² ............. H01B 3/12; H01G 4/12
[58] Field of Search .......... 252/63.5, 63.2; 106/73.31, 39.5; 423/593; 317/258

[56] References Cited

UNITED STATES PATENTS

| | | | |
|---|---|---|---|
| 3,600,652 | 8/1971 | Riley | 252/63.2 X |
| 3,732,117 | 5/1973 | Nitta et al. | 252/63.5 X |
| 3,847,829 | 11/1974 | Bouchard | 252/63.5 |
| 3,869,398 | 3/1975 | Yamaoka et al. | 252/63.5 |
| 3,933,668 | 1/1976 | Takahashi et al. | 252/63.5 |

*Primary Examiner*—Harris A. Pitlick
*Attorney, Agent, or Firm*—Kenyon & Kenyon

[57] ABSTRACT

A ceramic dielectric compositon is provided which consists essentially of a sintered metal oxide mixture expressed by the formula:

$$[(Ba_{1-u}Me_u)O]_x \cdot [(Ta_{1-v}Nb_v)_2O_5]_y \cdot [Bi_2O_3]_z$$

where Me is at least one divalent metal selected from lead and strontium, and $x$, $y$, $z$, $u$ and $v$ are numbers falling within the following ranges $0.05 \leq x \leq 0.80$, $0.05 \leq y \leq 0.30$, $0.10 \leq z \leq 0.80$, $0 \leq u \leq 1.00$, $0 \leq v \leq 1.00$ and $x + y + z = 1.0$.

This composition may contain specified metal oxide additives. The ceramic dielectric composition is sintered at a relatively low temperature and exhibits a dielectric constant varying linearly depending upon temperature variations over a wide use range, a reduced dielectric loss, enhanced resistivity and breakdown voltage, and therefore, is particularly suitable for "temperature-compensating" capacitors of a compact type with large capacity.

9 Claims, No Drawings

CERAMIC DIELECTRIC COMPOSITION

This invention relates to a ceramic dielectric composition and more particularly to an improved ceramic dielectric composition, which is characterized by being sintered at a relatively low temperature, i.e., from approximately 700° C to approximately 900° C or so, exhibiting a dielectric constant varying linearly depending upon temperature variations over a wide use range, a reduced dielectric loss and enhanced resistivity and breakdown voltage. This ceramic dielectric composition is particularly suitable for "temperature-compensating" capacitors of a compact-type with large capacity such as laminar capacitors.

As ceramic dielectrics used in temperature-compensating capacitors, those which exhibit an enhanced dielectric constant, a reduced dielectric loss factor and a linear dependence of the dielectric constant upon temperature variations over a wide use range as required. Most ceramic dielectrics heretofore proposed for temperature-compensating capacitors contain as the basic ingredient titanium dioxide ($TiO_2$) such as $SrTiO_3$, $CaTiO_3$, $MgTiO_3$ or $La_2O_3·TiO_2$. Suitable sintering temperatures of these ceramic dielectric compositions are generally 1,200° to 1,400° C.

Recently, a ceramic capacitor which is more compact and of more improved capacity and possesses a high reliability has been desired in the field including the communication industry. Thus, a capacitor of a thin ceramic film having 0.1 to 0.2 mm thickness and a ceramic laminar capacitor composed of a plurality of superimposed laminae each having a thickness of approximately 50 microns or less have been put to practical use.

However, such laminar ceramics of the known $TiO_2$-base type are not satisfactory from the following points of view. First, since suitable sintering temperatures are high, the dielectric bodies are liable to be distorted and poor in yield. Second, laminar internal electrodes used in the laminar capacitor must be made of metals having a high melting point such as platinum or a platinum-palladium alloy and are, therefore, costly.

It is an object of the present invention to provide ceramic dielectric compositions having optimum sintering tempertures of approximately 600° to approximately 950° C, i.e. lower to a considerble extent than those of the known $TiO_2$-base type dielectrics.

It is another object of the present invention to provide ceramic dielectric compositions having a dielectric constant varying linearly depending upon temperature variations over a broad use range.

It is still another object of the present invention to provide ceramic capacitors of enhanced reliability, i.e. improved insulation resistance and breakdown voltage.

It is a further object of the present invention to provide ceramic dielectric compositions particularly suitable for a temperature-compensating capacitor of a compact and laminar type.

Other objects and advantages will be apparent from the following description.

In accordance with the present invention, there is provided a ceramic dielectric composition consisting essentially of sintered metal oxide mixture expressed by the formula:

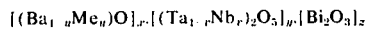

where Me is at least one divalent metal selected from the group consisting of lead and strontium, and $x, y, z, u$ and $v$ are numbers falling within the following ranges $$0.05 \leq x \leq 0.80,$$

$$0.05 \leq y \leq 0.30,$$

$$0.10 \leq z \leq 0.80,$$

$$0 \leq u \leq 1.00,$$

$$0 \leq v \leq 1.00 \text{ and}$$

$$x + y + z = 1.0.$$

If the ratio of $x:y:z$ is 1:1:1 in the abovementioned formula, the ceramic dielectric composition is a ferroelectric substance which is popularly known as one of the Bi-Layer type dielectrics represented by the formula $A^{2+}Bi_2R^{5+}O_9$, where $A^{2+}$ and $R^{5+}$ are divalent and pentavalent metals, respectively. It has been found that, when y of the above-mentioned formula falls within the range of approximately 0.30 to approximately 0.33, the ceramic dielectric composition is comprised of mixed crystals of a ferroelectric substance and a paraelectric substance. This ceramic dielectric composition is of little or no practical use because they exhibit large dielectric loss. Further, it has been found that, when y of the above-mentioned formula is not more than approximately 0.30, the ceramic dielectric composition is comprised of a single crystal and paraelectric, and the optimum sintering temperature is low, i.e. approximately 600° to approximately 950° C. From this finding, the ceramic dielectric composition of the invention has been completed.

When x of the above-mentioned formula is less than 0.05, variations in dielectric constant of the dielectrics depending upon temperature variations are non-linear. In contrast, when x exceeds 0.80, the dielectrics are poor in resistivity. Therefore, x should be within the range of 0.05 to 0.80, preferably 0.20 to 0.60.

The optimum sintering temperature of the dielectrics of the above-mentioned formula becomes low with a decrease of y. However, when y is too small, the dielectrics are poor in resistivity. In contrast, when y is too large, the dielectrics exhibit undesirably large dielectric loss. The range of y is from 0.05 to 0.30, preferably from 0.10 to 0.25. In such range, the dielectrics exhibit a resistivity of the order of $10^{13}$ to $10^{15}$ ohm-cm, which is far larger than those of the known $TiO_2$-base type. This high resistivity results in enhancement in breakdown voltage. The dielectrics with y in the range of 0.05 to 0.30 possess a low sintering temperature of approximately 600° to approximately 950° C, and the permissible sintering temperature range is wide, i.e. approximately 50° to 100° C. Further, the dielectrics with y in the range of 0.05 to 0.30 exhibit a low dielectic loss factor of approximately $0.5 \times 10^{-4}$ to approximately $12 \times 10^{-4}$.

When z of the above-mentioned formula is less than 0.10, variations in dielectric constant depending upon temperature variations are non-linear. In contrast, when z is more than 0.80, the dielectrics are poor in sintering characteristics. The prefereable range of z is from 0.20 to 0.65.

Both u and v of the above-mentioned formula may be varied within the range of 0 to 1.0. In other words, the ratio of BaO to PbO and/or SrO and the ratio of $Ta_2O_5$ to $Nb_2O_5$ may be optionally varied. When both u and v are zero, i.e. the dielectrics are of the formula; $[BaO]_x\cdot[Ta_2O_5]_y\cdot[Bi_2O_3]_z$, and x, y and z are within the hereinbefore-mentioned ranges, the temperature coefficient of dielectric constant ($\epsilon.TC$) is positive. However, the temperature coefficient of dielectric constant can be approximately zero or negative by partially substituting PbO and/or SrO for BaO and $Nb_2O_5$ for $Ta_2O_5$, respectively. Particularly, partial substitution of $Nb_2O_5$ for $Ta_2O_5$ reduces the dependence of the temperature coefficient $\epsilon.TC$ upon the variation in the ratio of BaO to PbO and/or SrO in the ingredient $(Ba_{1-u}Me_u)O$, and therefore, results in dielectrics exhibiting a temperature coefficient $\epsilon.TC$ of approximately zero, even if the ratio of BaO to PbO and/or SrO is varied over a relatively broad range For this advantage and the desired dielectric loss, preferable ranges of u and v are from 0.2 to 0.8 and from 0 to 0.6, respectively.

The ceramic dielectric composition of the invention may contain a minor amount of an additive metal oxide selected from titanium oxide, chromium oxide, molybdenum oxide and tungsten oxide. The ceramic dielectric composition having such an additive is advantageous over the fundamental dielectric composition of the hereinbefore-mentioned formula in that capacitors made of the former composition possess an improved load-durability of insulation resistance at a high temperature.

Laminar capacitors made of the fundamental dielectric composition having no additive exhibit an insulation resistance reduction to an extent such that, when they are continuously used at a temperature of 125° C and a voltage of 100V over a period of 1,000 hours, the initial insulation resistance on the order of $10^{13}$ ohm decreases to on the order of $10^{12}$ ohm. In contrast, capacitors made of the dielectrics having the additive exhibit little or no reduction in the insulation resistance even after continuous use of 10,000 hours.

The amount of the additive is preferably not more than 4% by weight, more preferably within the range of 0.05% to 1% by weight, based on the weight of the fundamental dielectric composition of the hereinbefore-mentioned formula and expressed in terms of the amount of titanium dioxide ($TiO_2$), chromic oxide ($Cr_2O_3$), molybdenum trioxide ($MoO_3$) and tungsten trioxide ($WO_3$), respectively. The load durability of insulation resistance is improved by the addition even in a trace amount, but becomes satisfactory by the addition of at least 0.05% by weight. When the amount of the additive is larger than 1% by weight, said load durability is approximately the same level, and when it exceeds 4% by weight, the optimum sintering temperature becomes undesirably high.

The above-mentioned additives may be used either alone or in combination. Of the additives, titanium oxide is most preferable because the resulting ceramic dielectrics consist of micro crystal grains.

The ceramic dielectric compositions of the present invention may be prepared as follows. Finely divided particles or powders of the respective metal oxides are blended with each other and shaped into a suitable form such as tablets. The shaped product is pre-sintered at a temperature of approximately 500° C to 800° C for 0.5 to 5 hours. The pre-sintered product is pulverized into fine particles or powders and shaped into a suitable form using or not using a binder. Then, the shaped product is sintered at a temperature of 600° C to 950° C for 0.5 to 8 hours. If desired, the aforesaid pre-sintering and the subsequent pulverization may be repeated prior to the sintering.

Instead of metal oxides, the respective metal compounds may be used which are in the form of carbonate salts, organic acid salts and hydroxides.

The invention is further disclosed in the following examples, which are illustrative but not limitative thereof. In the examples, percentages are by weight unless otherwise specified and asterisked specimen numbers in Tables I and II are comparative examples.

EXAMPLE 1

This example illustrates the fundamental ceramic dielectric compositions.

Using finely divided powders of barium monooxide (BaO), lead monooxide (PbO), strontium monooxide (SrO), tantalum pentoxide ($Ta_2O_5$), niobium pentoxide ($Nb_2O_5$) and bismuth trioxide ($Bi_2O_3$), various ceramic dielectric compositions were prepared as follows.

The respective finely divided metal oxide powders were blended with each other and shaped into tablets. The tablets were presintered at a temperature of 500° to 800° C for 2 hours. The presintered tablets were pulverized into powders having a particle size of several microns by using a ball mill. After a binder was added to the powders, the powders were press-formed into discs having a diameter of 16 mm and a thickness of 1.0 mm. The discs were sintered at a temperature shown in Table I, below, for a period of one to two hours in an air atmosphere. Each disc was plated with a silver electrode, and its electrical and dielectric characteristics were tested. The test results and the compositions of the ceramic dielectrics are shown in Table I.

In Table I, double asterisked data in the column of $\epsilon.TC$ mean that variations in the dielectric constant depending upon temperature variations are not linear. Both dielectric constant and dielectric loss factor were measured at a frequency of 1 MHz.

Table I

| No. | X | Specimen Y | Z | U | $Ba_{1-u}Me_u$ | | | V | $Ta_{1-v}Nb_v$ | | Dielectric constant $\epsilon s$ | Tan δ ×10$^{-4}$ | Resistivity (ohm-cm) | $\epsilon.TC$ (ppm/° C) | Sintering temperature (° C) |
|---|---|---|---|---|---|---|---|---|---|---|---|---|---|---|---|
| | | | | | Ba | Pb | Sr | | Ta | Nb | | | | | |
| 1* | 0.333 | 0.333 | 0.333 | 1.0 | 0 | 1.0 | 0 | 0 | 1.0 | 0 | 191 | 192 | 1×10$^{13}$ | ** | 1050 |
| 2* | 0.34 | 0.32 | 0.34 | 1.0 | 0 | 1.0 | 0 | 0 | 1.0 | 0 | 151 | 145 | 2×10$^{14}$ | ** | 1000 |
| 3 | 0.35 | 0.30 | 0.35 | 1.0 | 0 | 1.0 | 0 | 0 | 1.0 | 0 | 82 | 1.0 | 1×10$^{15}$ | −215 | 910 |
| 4 | 0.375 | 0.25 | 0.375 | 1.0 | 0 | 1.0 | 0 | 0 | 1.0 | 0 | 77 | 0.8 | 1×10$^{15}$ | −153 | 900 |
| 5 | 0.40 | 0.20 | 0.40 | 1.0 | 0 | 1.0 | 0 | 0 | 1.0 | 0 | 75 | 0.7 | 2×10$^{14}$ | −143 | 850 |
| 6 | 0.425 | 0.15 | 0.425 | 1.0 | 0 | 1.0 | 0 | 0 | 1.0 | 0 | 67 | 0.8 | 8×10$^{13}$ | −191 | 850 |
| 7 | 0.45 | 0.10 | 0.45 | 1.0 | 0 | 1.0 | 0 | 0 | 1.0 | 0 | 71 | 1.3 | 8×10$^{13}$ | −177 | 830 |
| 8 | 0.475 | 0.05 | 0.475 | 1.0 | 0 | 1.0 | 0 | 0 | 1.0 | 0 | 60 | 2.0 | 7×10$^{12}$ | −120 | 710 |
| 9* | 0.4875 | 0.025 | 0.4875 | 1.0 | 0 | 1.0 | 0 | 0 | 1.0 | 0 | 56 | 2.0 | 3×10$^{11}$ | −110 | 600 |
| 10 | 0.30 | 0.25 | 0.45 | 1.0 | 0 | 1.0 | 0 | 0 | 1.0 | 0 | 61 | 0.6 | 2×10$^{13}$ | −127 | 900 |
| 11 | 0.20 | 0.25 | 0.55 | 1.0 | 0 | 1.0 | 0 | 0 | 1.0 | 0 | 62 | 0.8 | 5×10$^{13}$ | −123 | 900 |

Table I-continued

| No. | X | Y | Z | U | Ba | Pb | Sr | V | Ta | Nb | Dielectric constant $\epsilon s$ | Tan δ $\times 10^{-4}$ | Resistivity (ohm-cm) | ε.TC (ppm/°C) | Sintering temperature (°C) |
|---|---|---|---|---|---|---|---|---|---|---|---|---|---|---|---|
| 12 | 0.10 | 0.25 | 0.65 | 1.0 | 0 | 1.0 | 0 | 0 | 1.0 | 0 | 64 | 1.1 | 1×10¹³ | −150 | 900 |
| 13 | 0.30 | 0.20 | 0.50 | 1.0 | 0 | 1.0 | 0 | 0 | 1.0 | 0 | 75 | 1.5 | 2×10¹³ | −112 | 870 |
| 14* | 0.025 | 0.25 | 0.725 | 1.0 | 0 | 1.0 | 0 | 0 | 1.0 | 0 | 66 | 8.3 | 4×10¹¹ | ** | 970 |
| 15 | 0.25 | 0.10 | 0.65 | 1.0 | 0 | 1.0 | 0 | 0 | 1.0 | 0 | 62 | 2.4 | 3×10¹³ | −65 | 830 |
| 16 | 0.10 | 0.10 | 0.80 | 1.0 | 0 | 1.0 | 0 | 0 | 1.0 | 0 | 58 | 4.9 | 8×10¹² | +20 | 710 |
| 17* | 0.075 | 0.075 | 0.85 | 1.0 | 0 | 1.0 | 0 | 0 | 1.0 | 0 | 52 | 59 | 2×10¹⁰ | +80 | 700 |
| 18 | 0.45 | 0.25 | 0.30 | 1.0 | 0 | 1.0 | 0 | 0 | 1.0 | 0 | 56 | 2.2 | 3×10¹³ | −171 | 900 |
| 19 | 0.55 | 0.25 | 0.20 | 1.0 | 0 | 1.0 | 0 | 0 | 1.0 | 0 | 65 | 2.7 | 5×10¹³ | −272 | 900 |
| 20 | 0.55 | 0.30 | 0.15 | 1.0 | 0 | 1.0 | 0 | 0 | 1.0 | 0 | 72 | 2.7 | 3×10¹³ | −314 | 930 |
| 21* | 0.55 | 0.325 | 0.125 | 1.0 | 0 | 1.0 | 0 | 0 | 1.0 | 0 | 120 | 200 | 1×10¹³ | ** | 1050 |
| 22 | 0.65 | 0.25 | 0.10 | 1.0 | 0 | 1.0 | 0 | 0 | 1.0 | 0 | 77 | 2.9 | 5×10¹³ | −354 | 930 |
| 23* | 0.675 | 0.25 | 0.075 | 1.0 | 0 | 1.0 | 0 | 0 | 1.0 | 0 | 124 | 10 | 2×10¹¹ | +1400 | 1050 |
| 24 | 0.50 | 0.20 | 0.30 | 1.0 | 0 | 1.0 | 0 | 0 | 1.0 | 0 | 80 | 0.5 | 3×10¹³ | −280 | 840 |
| 25 | 0.60 | 0.10 | 0.30 | 1.0 | 0 | 1.0 | 0 | 0 | 1.0 | 0 | 70 | 1.2 | 2×10¹³ | −150 | 830 |
| 26 | 0.80 | 0.10 | 0.10 | 1.0 | 0 | 1.0 | 0 | 0 | 1.0 | 0 | 71 | 8.3 | 5×10¹³ | −110 | 800 |
| 27* | 0.85 | 0.05 | 0.10 | 1.0 | 0 | 1.0 | 0 | 0 | 1.0 | 0 | 64 | 10.2 | 4×10¹¹ | −350 | 810 |
| 28 | 0.65 | 0.05 | 0.30 | 1.0 | 0 | 1.0 | 0 | 0 | 1.0 | 0 | 52 | 9.1 | 1×10¹³ | −170 | 710 |
| 29 | 0.30 | 0.05 | 0.65 | 1.0 | 0 | 1.0 | 0 | 0 | 1.0 | 0 | 57 | 8.3 | 9×10¹² | −20 | 710 |
| 30* | 0.333 | 0.333 | 0.333 | 1.0 | 0 | 1.0 | 0 | 1.0 | 0 | 1.0 | 113 | 180 | 2×10¹³ | ** | 1000 |
| 31* | 0.34 | 0.310 | 0.34 | 1.0 | 0 | 1.0 | 0 | 1.0 | 0 | 1.0 | 109 | 120 | 4×10¹³ | ** | 975 |
| 32 | 0.35 | 0.30 | 0.35 | 1.0 | 0 | 1.0 | 0 | 1.0 | 0 | 1.0 | 92 | 6.7 | 6×10¹⁴ | −200 | 900 |
| 33 | 0.37 | 0.26 | 0.37 | 1.0 | 0 | 1.0 | 0 | 1.0 | 0 | 1.0 | 74 | 5.0 | 2×10¹⁵ | −219 | 850 |
| 34 | 0.385 | 0.230 | 0.385 | 1.0 | 0 | 1.0 | 0 | 1.0 | 0 | 1.0 | 79 | 2.0 | 1×10¹⁵ | −270 | 800 |
| 35 | 0.40 | 0.20 | 0.40 | 1.0 | 0 | 1.0 | 0 | 1.0 | 0 | 1.0 | 72 | 0.8 | 4×10¹⁴ | −245 | 775 |
| 36 | 0.425 | 0.150 | 0.425 | 1.0 | 0 | 1.0 | 0 | 1.0 | 0 | 1.0 | 60 | 1.0 | 2×10¹⁴ | −200 | 700 |
| 37 | 0.45 | 0.10 | 0.45 | 1.0 | 0 | 1.0 | 0 | 1.0 | 0 | 1.0 | 45 | 1.3 | 2×10¹⁴ | −190 | 650 |
| 38 | 0.475 | 0.050 | 0.475 | 1.0 | 0 | 1.0 | 0 | 1.0 | 0 | 1.0 | 43 | 2.0 | 1×10¹³ | −200 | 610 |
| 39* | 0.4875 | 0.025 | 0.4875 | 1.0 | 0 | 1.0 | 0 | 1.0 | 0 | 1.0 | 40 | 5.0 | 2×10¹¹ | −140 | — |
| 40 | 0.30 | 0.25 | 0.45 | 1.0 | 0 | 1.0 | 0 | 1.0 | 0 | 1.0 | 87 | 6.7 | 2×10¹⁴ | −136 | 840 |
| 41 | 0.225 | 0.250 | 0.625 | 1.0 | 0 | 1.0 | 0 | 1.0 | 0 | 1.0 | 91 | 7.7 | 1×10¹⁴ | −101 | 840 |
| 42 | 0.15 | 0.25 | 0.60 | 1.0 | 0 | 1.0 | 0 | 1.0 | 0 | 1.0 | 91 | 7.7 | 6×10¹³ | −103 | 840 |
| 43 | 0.05 | 0.30 | 0.65 | 1.0 | 0 | 1.0 | 0 | 1.0 | 0 | 1.0 | 74 | 10.0 | 4×10¹³ | −74 | 870 |
| 44 | 0.30 | 0.20 | 0.50 | 1.0 | 0 | 1.0 | 0 | 1.0 | 0 | 1.0 | 82 | 1.0 | 7×10¹⁴ | −256 | 750 |
| 45 | 0.15 | 0.20 | 0.65 | 1.0 | 0 | 1.0 | 0 | 1.0 | 0 | 1.0 | 76 | 2.0 | 2×10¹⁴ | −27 | 750 |
| 46 | 0.25 | 0.10 | 0.65 | 1.0 | 0 | 1.0 | 0 | 1.0 | 0 | 1.0 | 50 | 2.4 | 8×10¹³ | −4 | 630 |
| 47 | 0.10 | 0.10 | 0.80 | 1.0 | 0 | 1.0 | 0 | 1.0 | 0 | 1.0 | 46 | 3.3 | 1×10¹³ | +15 | 600 |
| 48* | 0.025 | 0.175 | 0.80 | 1.0 | 0 | 1.0 | 0 | 1.0 | 0 | 1.0 | 44 | 5.0 | 2×10¹¹ | +30 | 710 |
| 49* | 0.075 | 0.075 | 0.85 | 1.0 | 0 | 1.0 | 0 | 1.0 | 0 | 1.0 | 43 | 6.7 | 2×10¹⁰ | +75 | 600 |
| 50* | 0.50 | 0.35 | 0.15 | 1.0 | 0 | 1.0 | 0 | 1.0 | 0 | 1.0 | 120 | 240 | 2×10¹¹ | ** | 1140 |
| 52 | 0.525 | 0.250 | 0.225 | 1.0 | 0 | 1.0 | 0 | 1.0 | 0 | 1.0 | 130 | 1.5 | 4×10¹⁴ | −1110 | 900 |
| 53 | 0.60 | 0.25 | 0.15 | 1.0 | 0 | 1.0 | 0 | 1.0 | 0 | 1.0 | 150 | 2.2 | 3×10¹⁴ | −1200 | 870 |
| 54* | 0.65 | 0.30 | 0.05 | 1.0 | 0 | 1.0 | 0 | 1.0 | 0 | 1.0 | 210 | 300 | 8×10¹¹ | ** | 1100 |
| 55 | 0.50 | 0.20 | 0.30 | 1.0 | 0 | 1.0 | 0 | 1.0 | 0 | 1.0 | 96 | 2.0 | 5×10¹³ | −414 | 750 |
| 56 | 0.65 | 0.20 | 0.15 | 1.0 | 0 | 1.0 | 0 | 1.0 | 0 | 1.0 | 152 | 2.6 | 5×10¹³ | −805 | 810 |
| 57 | 0.70 | 0.20 | 0.10 | 1.0 | 0 | 1.0 | 0 | 1.0 | 0 | 1.0 | 174 | 10.0 | 2×10¹³ | −1100 | 770 |
| 58 | 0.65 | 0.10 | 0.25 | 1.0 | 0 | 1.0 | 0 | 1.0 | 0 | 1.0 | 70 | 3.1 | 1×10¹⁴ | −540 | 710 |
| 59* | 0.825 | 0.050 | 0.125 | 1.0 | 0 | 1.0 | 0 | 1.0 | 0 | 1.0 | 52 | 12.5 | 3×10¹¹ | −300 | 810 |
| 60* | 0.333 | 0.333 | 0.333 | 0 | 1.0 | 0 | 0 | 0 | 1.0 | 0 | 290 | 1500 | 2×10¹³ | ** | 1030 |
| 61* | 0.34 | 0.32 | 0.34 | 0 | 1.0 | 0 | 0 | 0 | 1.0 | 0 | 230 | 1000 | 4×10¹³ | ** | 950 |
| 62 | 0.35 | 0.30 | 0.35 | 0 | 1.0 | 0 | 0 | 0 | 1.0 | 0 | 92 | 9.1 | 2×10¹⁴ | +45 | 920 |
| 63 | 0.375 | 0.25 | 0.375 | 0 | 1.0 | 0 | 0 | 0 | 1.0 | 0 | 54 | 6.7 | 2×10¹⁴ | +114 | 920 |
| 64 | 0.40 | 0.20 | 0.40 | 0 | 1.0 | 0 | 0 | 0 | 1.0 | 0 | 46 | 5.0 | 2×10¹⁴ | +147 | 850 |
| 65 | 0.425 | 0.15 | 0.425 | 0 | 1.0 | 0 | 0 | 0 | 1.0 | 0 | 40 | 4.0 | 6×10¹⁴ | +168 | 840 |
| 66 | 0.45 | 0.10 | 0.45 | 0 | 1.0 | 0 | 0 | 0 | 1.0 | 0 | 37 | 5.0 | 6×10¹⁴ | +174 | 800 |
| 67 | 0.475 | 0.05 | 0.475 | 0 | 1.0 | 0 | 0 | 0 | 1.0 | 0 | 32 | 7.1 | 9×10¹³ | +210 | 750 |
| 68* | 0.4875 | 0.025 | 0.4875 | 0 | 1.0 | 0 | 0 | 0 | 1.0 | 0 | 28 | 7.5 | 1×10¹¹ | +300 | 750 |
| 69 | 0.30 | 0.25 | 0.45 | 0 | 1.0 | 0 | 0 | 0 | 1.0 | 0 | 58 | 4.8 | 4×10¹⁴ | +104 | 930 |
| 70 | 0.20 | 0.25 | 0.55 | 0 | 1.0 | 0 | 0 | 0 | 1.0 | 0 | 69 | 8.3 | 3×10¹⁴ | +92 | 930 |
| 71 | 0.10 | 0.25 | 0.65 | 0 | 1.0 | 0 | 0 | 0 | 1.0 | 0 | 82 | 125 | 2×10¹⁴ | +40 | 930 |
| 72 | 0.30 | 0.20 | 0.50 | 0 | 1.0 | 0 | 0 | 0 | 1.0 | 0 | 51 | 7.0 | 8×10¹⁴ | +86 | 870 |
| 73 | 0.05 | 0.25 | 0.70 | 0 | 1.0 | 0 | 0 | 0 | 1.0 | 0 | 49 | 4.0 | 2×10¹⁴ | +90 | 870 |
| 74 | 0.25 | 0.10 | 0.65 | 0 | 1.0 | 0 | 0 | 0 | 1.0 | 0 | 57 | 6.5 | 2×10¹⁴ | +110 | 800 |
| 75 | 0.10 | 0.10 | 0.80 | 0 | 1.0 | 0 | 0 | 0 | 1.0 | 0 | 63 | 9.6 | 5×10¹⁴ | +214 | 870 |
| 76* | 0.075 | 0.075 | 0.85 | 0 | 1.0 | 0 | 0 | 0 | 1.0 | 0 | 72 | 1000 | 2×10¹⁴ | ** | 840 |
| 77 | 0.45 | 0.25 | 0.30 | 0 | 1.0 | 0 | 0 | 0 | 1.0 | 0 | 52 | 5.3 | 5×10¹⁴ | +82 | 960 |
| 78 | 0.55 | 0.25 | 0.20 | 0 | 1.0 | 0 | 0 | 0 | 1.0 | 0 | 44 | 10.0 | 3×10¹⁴ | +140 | 930 |
| 79 | 0.55 | 0.30 | 0.15 | 0 | 1.0 | 0 | 0 | 0 | 1.0 | 0 | 70 | 10.0 | 4×10¹⁴ | +320 | 930 |
| 80* | 0.55 | 0.325 | 0.125 | 0 | 1.0 | 0 | 0 | 0 | 1.0 | 0 | 174 | 24.0 | 2×10¹⁴ | ** | 1050 |
| 81 | 0.65 | 0.25 | 0.10 | 0 | 1.0 | 0 | 0 | 0 | 1.0 | 0 | 32 | 10.5 | 4×10¹³ | +155 | 930 |
| 82* | 0.675 | 0.25 | 0.075 | 0 | 1.0 | 0 | 0 | 0 | 1.0 | 0 | 44 | 450 | 2×10¹¹ | ** | 940 |
| 83 | 0.50 | 0.20 | 0.30 | 0 | 1.0 | 0 | 0 | 0 | 1.0 | 0 | 39 | 6.7 | 4×10¹⁴ | +167 | 870 |
| 84 | 0.60 | 0.10 | 0.30 | 0 | 1.0 | 0 | 0 | 0 | 1.0 | 0 | 37 | 6.4 | 7×10¹⁴ | +210 | 800 |
| 85 | 0.80 | 0.10 | 0.10 | 0 | 1.0 | 0 | 0 | 0 | 1.0 | 0 | 35 | 10.0 | 2×10¹³ | +267 | 870 |
| 86* | 0.85 | 0.05 | 0.10 | 0 | 1.0 | 0 | 0 | 0 | 1.0 | 0 | 30 | 14.0 | 4×10¹¹ | ** | 870 |
| 87 | 0.65 | 0.05 | 0.30 | 0 | 1.0 | 0 | 0 | 0 | 1.0 | 0 | 32 | 8.1 | 7×10¹³ | +270 | 830 |
| 88 | 0.30 | 0.05 | 0.65 | 0 | 1.0 | 0 | 0 | 0 | 1.0 | 0 | 42 | 7.8 | 1×10¹⁴ | +150 | 760 |
| 89* | 0.333 | 0.333 | 0.333 | 0 | 1.0 | 0 | 0 | 0 | 1.0 | 0 | 290 | 1500 | 2×10¹³ | ** | 1030 |
| 90 | 0.35 | 0.30 | 0.35 | 0.66 | 0.34 | 0.66 | 0 | 0 | 1.0 | 0 | 84 | 2.4 | 6×10¹⁴ | ±0 | 910 |
| 91 | 0.375 | 0.25 | 0.375 | 0.1 | 0.9 | 0.1 | 0 | 0 | 1.0 | 0 | 60 | 4.7 | 6×10¹⁴ | +120 | 920 |
| 92 | 0.375 | 0.25 | 0.375 | 0.4 | 0.6 | 0.4 | 0 | 0 | 1.0 | 0 | 71 | 2.1 | 6×10¹⁴ | +8 | 920 |
| 93 | 0.375 | 0.25 | 0.375 | 0.58 | 0.42 | 0.58 | 0 | 0 | 1.0 | 0 | 75 | 1.2 | 1×10¹⁵ | ±0 | 900 |
| 94 | 0.375 | 0.25 | 0.375 | 0.7 | 0.3 | 0.7 | 0 | 0 | 1.0 | 0 | 76 | 1.0 | 7×10¹⁴ | −7 | 900 |
| 95 | 0.375 | 0.25 | 0.375 | 0.9 | 0.1 | 0.9 | 0 | 0 | 1.0 | 0 | 78 | 0.7 | 2×10¹⁴ | −120 | 900 |
| 96 | 0.375 | 0.25 | 0.375 | 0.1 | 0.9 | 0.05 | 0.05 | 0 | 1.0 | 0 | 60 | 4.2 | 3×10¹⁴ | +95 | 900 |
| 97 | 0.375 | 0.25 | 0.375 | 0.2 | 0.8 | 0.1 | 0.1 | 0 | 1.0 | 0 | 64 | 3.6 | 3×10¹⁴ | +60 | 900 |
| 98 | 0.375 | 0.25 | 0.375 | 0.2 | 0.8 | 0 | 0.2 | 0 | 1.0 | 0 | 64 | 8.9 | 3×10¹⁴ | +67 | 940 |

Table I-continued

| No. | X | Specimen Y | Z | U | Ba | Ba₁₋ₙMeₙ Pb | Sr | V | Ta₁₋ᵣNbᵣ Ta | Nb | Dielectric constant $\epsilon s$ | Tan δ ×10⁻⁴ | Resistivity (ohm-cm) | ε.TC (ppm/°C) | Sintering temperature (°C) |
|---|---|---|---|---|---|---|---|---|---|---|---|---|---|---|---|
| 99 | 0.375 | 0.25 | 0.375 | 0.25 | 0.75 | 0 | 0.25 | 0 | 1.0 | 0 | 60 | 10.0 | 2×10¹⁴ | +86 | 950 |
| 100 | 0.375 | 0.25 | 0.375 | 0.58 | 0.42 | 0.58 | 0 | 0.2 | 0.8 | 0.2 | 60 | 1.0 | 7×10¹³ | ±0 | 840 |
| 101 | 0.375 | 0.25 | 0.375 | 0.58 | 0.42 | 0.58 | 0 | 0.4 | 0.6 | 0.4 | 64 | 1.0 | 7×10¹⁴ | ±0 | 840 |
| 102 | 0.375 | 0.25 | 0.375 | 0.58 | 0.42 | 0.58 | 0 | 0.6 | 0.4 | 0.6 | 68 | 1.2 | 5×10¹⁴ | −7 | 840 |
| 103 | 0.375 | 0.25 | 0.375 | 0.58 | 0.42 | 0.58 | 0 | 0.8 | 0.2 | 0.8 | 73 | 1.4 | 5×10¹⁴ | −16 | 800 |
| 104 | 0.375 | 0.25 | 0.375 | 0.2 | 0.8 | 0.2 | 0 | 0.5 | 0.5 | 0.5 | 67 | 1.0 | 3×10¹⁴ | +4 | 840 |
| 105 | 0.375 | 0.25 | 0.375 | 0.4 | 0.6 | 0.4 | 0 | 0.4 | 0.6 | 0.4 | 66 | 1.0 | 3×10¹⁴ | ±0 | 840 |
| 106 | 0.375 | 0.25 | 0.375 | 0.6 | 0.4 | 0.6 | 0 | 0.45 | 0.35 | 0.45 | 67 | 0.9 | 3×10¹⁴ | ±0 | 840 |
| 107 | 0.425 | 0.15 | 0.425 | 0.53 | 0.47 | 0.53 | 0 | 0 | 1.0 | 0 | 68 | 1.4 | 5×10¹⁴ | ±0 | 840 |
| 108 | 0.425 | 0.15 | 0.425 | 0.35 | 0.65 | 0.35 | 0 | 0.5 | 0.5 | 0.5 | 69 | 1.5 | 5×10¹⁴ | ±0 | 790 |
| 109 | 0.475 | 0.05 | 0.475 | 0.37 | 0.63 | 0.37 | 0 | 0 | 1.0 | 0 | 41 | 4.6 | 1×10¹⁴ | ±0 | 710 |
| 110 | 0.475 | 0.05 | 0.475 | 0.31 | 0.69 | 0.31 | 0 | 0.4 | 0.6 | 0.4 | 44 | 5.1 | 2×10¹⁴ | ±0 | 700 |
| 111 | 0.05 | 0.25 | 0.70 | 0.65 | 0.35 | 0.65 | 0 | 0 | 1.0 | 0 | 68 | 2.0 | 4×10¹³ | ±0 | 870 |
| 112 | 0.05 | 0.25 | 0.70 | 0.42 | 0.58 | 0.42 | 0 | 0.5 | 0.5 | 0.5 | 71 | 2.3 | 1×10¹⁴ | ±0 | 810 |
| 113 | 0.10 | 0.10 | 0.80 | 0.10 | 0.90 | 0.10 | 0 | 0 | 1.0 | 0 | 58 | 1.1 | 2×10¹⁴ | ±0 | 870 |
| 114 | 0.10 | 0.10 | 0.80 | 0.10 | 0.90 | 0.10 | 0 | 0.3 | 0.7 | 0.3 | 61 | 0.9 | 2×10¹⁴ | ±0 | 820 |
| 115 | 0.65 | 0.25 | 0.10 | 0.55 | 0.45 | 0.55 | 0 | 0 | 1.0 | 0 | 57 | 3.2 | 1×10¹³ | ±0 | 930 |
| 116 | 0.65 | 0.25 | 0.10 | 0.45 | 0.55 | 0.45 | 0 | 0.35 | 0.75 | 0.35 | 60 | 3.1 | 5×10¹⁴ | ±0 | 870 |
| 117 | 0.80 | 0.10 | 0.10 | 0.30 | 0.70 | 0.30 | 0 | 0 | 1.0 | 0 | 60 | 7.4 | 7×10¹³ | ±0 | 840 |
| 118 | 0.80 | 0.10 | 0.10 | 0.18 | 0.82 | 0.18 | 0 | 0.42 | 0.58 | 0.42 | 67 | 8.1 | 1×10¹⁴ | ±0 | 810 |
| 119 | 0.375 | 0.25 | 0.375 | 0.1 | 0.9 | 0.1 | 0 | 1.0 | 0 | 1.0 | 78 | 1.2 | 5×10¹⁴ | −36 | 800 |
| 120 | 0.375 | 0.25 | 0.375 | 0.58 | 0.42 | 0.58 | 0 | 1.0 | 0 | 1.0 | 80 | 1.1 | 5×10¹⁴ | −32 | 800 |
| 121 | 0.375 | 0.25 | 0.375 | 0.7 | 0.3 | 0.7 | 0 | 1.0 | 0 | 1.0 | 80 | 1.1 | 5×10¹⁴ | −30 | 800 |
| 122 | 0.375 | 0.25 | 0.375 | 1.0 | 0 | 0 | 1.0 | 0.6 | 0.4 | 0.6 | 60 | 12.5 | 2×10¹⁴ | +100 | 950 |

EXAMPLE 2

This example illustrates electrical characteristics of laminar capacitors manufactured from the fundamental ceramic dielectric composition.

Layers of a fundamental ceramic dielectric composition prepared by the procedure set forth in Example 1, and of an internal electrode paste, the effective metal component of which was composed of only silver or of 70% of silver and 30% of gold, were superimposed alternately to form laminates. The laminates were heated at 500° C in an oxidative atmosphere, to burn out the organic materials, and then sintered at a temperature, shown in Table II below, for two hours. Each ceramic composition layer in the laminates had a thickness of 20 microns or 50 microns, as measured after the sintering. The laminates were fitted with external electrodes to form laminar capacitors. The laminar capacitors were tested for their insulation resistance and DC breakdown voltage ($V_{BD}$). Results are shown in Table II.

For comparison purposes, two known laminar capacitors were prepared, one of which was from a crystalline glass dielectric and a gold internal electrode, and another of which was from a TiO₂-base type ceramic dielectric and an internal electrode composed of 70% of platinum and 30% of palladium, by the procedure set forth above. The two laminar capacitors were similarly tested for their electrical characteristics. Results were shown in Talbe II.

Table II

| Dielectric materials | Thickness of ceramics Characteristics | 50 microns Insulation resistance (ohm) | $V_{BD}$ (V) | 20 microns Insulation resistance (ohm) | $V_{BD}$ (V) | Composition of electrode | Sintering temperature (°C) |
|---|---|---|---|---|---|---|---|
| Specimen No. 5 | | 2×10¹³ | 2,000 | 2×10¹² | 1,100 | Ag | 870 |
| | | 2×10¹³ | 2,000 | 2×10¹² | 1,150 | Ag:70 Au:30 | 870 |
| Specimen No. 34 | | 2×10¹³ | 2,100 | 5×10¹² | 1,300 | Ag | 800 |
| | | 2×10¹³ | 2,100 | 5×10¹² | 1,300 | Ag:70 Au:30 | 800 |
| Specimen No. 64 | | 2×10¹³ | 1,500 | 5×10¹² | 900 | Ag | 850 |
| | | 2×10¹³ | 1,500 | 5×10¹² | 900 | Ag:70 Au:30 | 850 |
| Specimen No. 101 | | 2×10¹³ | 2,100 | 1×10¹³ | 1,300 | Ag | 840 |
| | | 2×10¹³ | 2,100 | 1×10¹³ | 1,300 | Ag:70 Au:30 | 840 |
| Crystalline galss* | | 1.3×10¹³ | 1,000 | — | — | Au | 1,000 |
| TiO₂ base type* ceramics | | 4.0×10¹² | 700 | — | — | Pt:70 Pd:30 | 1,300 |

*Comparative examples

Further, it was proved that the variations of electrostatic capacity of capacitors (specimen Nos. 5, 34, 64 and 101) depending upon the temperature variations were linear over the temperature range from −55° C to +125° C, and their temperature coefficients were −143 ppm/° C, −270 ppm/° C, +147 ppm/° C and approximately zero ppm/° C, respectively. These features are similar to ε.TC shown in Table I.

Although gold, platinum or a platinum-palladium alloy had to be used as the internal electrode in a known ceramic laminar capacitor, it was proved that silver or silver alloys composed of a predominant amount of silver and a minor amount of platinum or palladium might be advantageously used in ceramic laminar capacitors prepared from the dielectric composition of the invention.

EXAMPLE 3

This example illustrates the effect brought about by the addition of the additives.

Laminar capacitors were prepared by the general procedure set forth in Example 2, wherein an internal electrode of silver was used and each ceramic layer in the laminates had a thickness of 20 microns. Each laminar capacitor was tested for its load-durability of insulation resistance by applying a voltage of 100 volts at 125° C. Results are shown in Table III, in which the load-durability is expressed in terms of the period (IR reduction period) during which the insulation resistance reduces to one tenth of the original value.

Table III

| Specimen No. | Fundamental composition (Specimen No.) | Additive | Amount of additive (%) | IR reduction period (hr) |
|---|---|---|---|---|
| 123 | 3 | TiO$_2$ | 0.3 | >10,000 |
| 124 | 8 | TiO$_2$ | 0.3 | >10,000 |
| 125 | 16 | TiO$_2$ | 0.3 | >10,000 |
| 126 | 22 | TiO$_2$ | 0.3 | >10,000 |
| 127 | 32 | TiO$_2$ | 0.3 | >10,000 |
| 128 | 38 | TiO$_2$ | 0.3 | >10,000 |
| 129 | 43 | TiO$_2$ | 0.3 | >10,000 |
| 130 | 57 | TiO$_2$ | 0.3 | >10,000 |
| 131 | 62 | TiO$_2$ | 0.3 | >10,000 |
| 132 | 63 | TiO$_2$ | 0.3 | >10,000 |
| 133 | 67 | TiO$_2$ | 0.3 | >10,000 |
| 134 | 75 | TiO$_2$ | 0.3 | >10,000 |
| 135 | 81 | TiO$_2$ | 0.3 | >10,000 |
| 90 | 90 | — | — | 1,000 |
| 136 | 90 | TiO$_2$ | 0.05 | 4,000 |
| 137 | 90 | TiO$_2$ | 0.1 | >10,000 |
| 138 | 90 | TiO$_2$ | 0.3 | >10,000 |
| 139 | 90 | TiO$_2$ | 0.5 | >10,000 |
| 140 | 90 | TiO$_2$ | 1.0 | >10,000 |
| 141 | 90 | TiO$_2$ | 4.0 | >10,000 |
| 142 | 90 | Cr$_2$O$_3$ | 0.3 | >10,000 |
| 143 | 90 | MoO$_3$ | 0.3 | >10,000 |
| 144 | 90 | WO$_3$ | 0.3 | >10,000 |
| 145 | 90 | TiO$_2$ Cr$_2$O$_3$ | 0.2 0.2 | >10,000 |
| 146 | 90 | MoO$_3$ WO$_3$ | 0.5 0.5 | >10,000 |
| 147 | 90 | TiO$_2$ MoO$_3$ | 0.5 0.5 | >10,000 |
| 148 | 90 | Cr$_2$O$_3$ MoO$_3$ | 0.4 0.4 | >10,000 |
| 149 | 90 | TiO$_2$ WO$_3$ | 0.5 0.5 | >10,000 |
| 97 | 97 | — | — | 1,000 |
| 150 | 97 | TiO$_2$ | 0.3 | >10,000 |
| 102 | 102 | — | — | 1,000 |
| 151 | 102 | TiO$_2$ | 0.3 | >10,000 |
| 122 | 122 | — | — | 1,000 |
| 152 | 122 | TiO$_2$ | 0.3 | >10,000 |
| 105 | 105 | — | — | 1,000 |
| 153 | 105 | TiO$_2$ | 0.3 | >10,000 |
| 120 | 120 | — | — | 1,000 |
| 154 | 120 | TiO$_2$ | 0.3 | >10,000 |
| 155 | 120 | TiO$_2$ | 1.0 | >10,000 |
| 156 | 120 | TiO$_2$ | 4.0 | >10,000 |
| 101 | 101 | — | — | 1,000 |
| 157 | 101 | Cr$_2$O$_3$ | 0.05 | 4,000 |
| 158 | 101 | Cr$_2$O$_3$ | 0.10 | >10,000 |
| 159 | 101 | Cr$_2$O$_3$ | 1.0 | >10,000 |
| 160 | 101 | Cr$_2$O$_3$ | 4.0 | >10,000 |
| 161 | 101 | MoO$_3$ | 1.0 | >10,000 |
| 162 | 101 | WO$_3$ | 1.0 | >10,000 |
| 163 | 101 | WO$_3$ | 4.0 | >10,000 |
| 164 | 101 | MoO$_3$ WO$_3$ | 0.5 0.5 | >10,000 |
| 165 | 101 | MoO$_3$ Cr$_2$O$_3$ | 0.5 0.5 | >10,000 |

What we claim is:

1. A ceramic dielectric composition consisting essentially of sintered metal oxide mixture expressed by the formula:

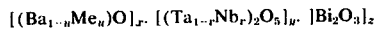

where Me is at least one divalent metal selected from the group consisting of lead and strontium, and $x$, $y$, $z$, $u$ and $v$ are numbers falling within the following ranges $$0.05 \leq x \leq 0.80,$$

$$0.05 \leq y \leq 0.30,$$

$$0.10 \leq z \leq 0.80,$$

$$0 \leq u \leq 1.00,$$

$$0 \leq v \leq 1.00 \text{ and}$$

$$x + y + z = 1.0$$

2. The ceramic dielectric composition according to claim 1 wherein $x$ is a positive number falling within the range of 0.20 to 0.60.

3. The ceramic dielectric composition according to claim 1 wherein $y$ is a positive number falling within the range of 0.10 to 0.25.

4. The ceramic dielectric composition according to claim 1 wherein $z$ is a positive number falling within the range of 0.20 to 0.65.

5. The ceramic dielectric composition according to claim 1 wherein $u$ is a positive number falling within the range of 0.2 to 0.8.

6. The ceramic dielectric composition according to claim 1 wherein $v$ is a number falling within the range of 0 to 0.6.

7. The ceramic dielectric composition according to claim 1 which further comprises at least one metal oxide selected from the group consisting of oxides of titanium, chromium, molybdenum and tungsten in an amount of not larger than 4.0% by weight based on the weight of the ceramic dielectric composition of said formula and expressed in terms of the amount of titanium dioxide (TiO$_2$), chromic oxide (Cr$_2$O$_3$), molybdenum trioxide (MoO$_3$) and tungsten trioxide (WO$_3$), respectively.

8. The ceramic dielectric composition according to claim 7 wherein the amount of said metal oxide is 0.05% to 1.0% by weight.

9. The ceramic dielectric composition according to claim 7 wherein said metal oxide is titanium oxide.

* * * * *

UNITED STATES PATENT OFFICE
CERTIFICATE OF CORRECTION

Patent No. 3,997,457          Dated December 14, 1976

Inventor(s) Koji Takahashi et al.

It is certified that error appears in the above-identified patent and that said Letters Patent are hereby corrected as shown below:

Column 1, line 20, change "as" to --are--.

Column 1, formula on bottom of page should be corrected to read as follows:

$$[(Ba_{1-u}Me_u)O]_x \cdot [(Ta_{1-v}Nb_v)_2O_5]_y \cdot [Bi_2O_3]_z$$

Column 2, line 64, correct spelling of "preferable".

UNITED STATES PATENT OFFICE
CERTIFICATE OF CORRECTION

Patent No. 3,997,457    Dated December 14, 1976

Inventor(s) Koji Takahashi et al.

It is certified that error appears in the above-identified patent and that said Letters Patent are hereby corrected as shown below:

Table II, first column, line 5, after the heading correct spelling of "glass".

Column 10, line 29, change "+ y + z = 1.0" to --x + y + z = 1.0--

Signed and Sealed this

Twenty-eighth Day of June 1977

[SEAL]

Attest:

RUTH C. MASON
Attesting Officer

C. MARSHALL DANN
Commissioner of Patents and Trademarks